US012480513B1

(12) United States Patent
Xun et al.

(10) Patent No.: US 12,480,513 B1
(45) Date of Patent: Nov. 25, 2025

(54) HOLLOW-STRUCTURED COOLING FAN

(71) Applicant: Guangzhou Juchuang Electronic Technology Co., Ltd., Guangdong (CN)

(72) Inventors: Hao Xun, Guangdong (CN); Chao Wu, Guangdong (CN); Jiawei Lv, Guangdong (CN)

(73) Assignee: Guangzhou Juchuang Electronic Technology Co., Ltd., Guangdong (CN)

( * ) Notice: Subject to any disclaimer, the term of this patent is extended or adjusted under 35 U.S.C. 154(b) by 0 days.

(21) Appl. No.: 19/289,092

(22) Filed: Aug. 3, 2025

(30) Foreign Application Priority Data

May 9, 2025 (CN) ........................ 202520910555.3

(51) Int. Cl.

| | |
|---|---|
| ***F04D 29/04*** | (2006.01) |
| ***F04D 19/00*** | (2006.01) |
| ***F04D 29/00*** | (2006.01) |
| ***F04D 29/056*** | (2006.01) |
| ***F04D 29/38*** | (2006.01) |
| ***F04D 29/52*** | (2006.01) |
| ***F21V 33/00*** | (2006.01) |

(52) U.S. Cl.
CPC ........... *F04D 29/04* (2013.01); *F04D 19/002* (2013.01); *F04D 29/005* (2013.01); *F04D 29/056* (2013.01); *F04D 29/388* (2013.01); *F04D 29/522* (2013.01); *F21V 33/0096* (2013.01)

(58) Field of Classification Search
CPC ...... F04D 19/002; F04D 29/04; F04D 29/043; F04D 29/044; F04D 29/046; F04D 29/05; F04D 29/053; F04D 29/056; F04D 29/388; F04D 29/522; F21V 33/0096
See application file for complete search history.

(56) References Cited

U.S. PATENT DOCUMENTS

| | | | | |
|---|---|---|---|---|
| 11,703,217 B1 * | 7/2023 | Lin | ..................... | F21V 33/0096 415/121.3 |
| 2020/0332804 A1 * | 10/2020 | Lin | ..................... | F04D 29/005 |
| 2021/0102547 A1 * | 4/2021 | Tsung-Wei | ............ | F04D 29/329 |
| 2022/0057080 A1 * | 2/2022 | Xu | ..................... | F21V 33/0096 |
| 2022/0128058 A1 * | 4/2022 | Xu | ..................... | F04D 29/005 |
| 2024/0196559 A1 * | 6/2024 | Peng | ..................... | F04D 19/002 |

FOREIGN PATENT DOCUMENTS

CN 218894790 4/2023

* cited by examiner

*Primary Examiner* — Sang K Kim
(74) *Attorney, Agent, or Firm* — JCIPRNET

(57) ABSTRACT

A hollow-structured cooling fan includes a fan frame, a fan blade, a display module, and a drive module. A mounting tube is disposed in a central portion of the fan frame, a first bearing is disposed within the mounting tube; a sleeve shaft is disposed in a central portion of the fan blade, and inserted into the mounting tube, and a second bearing is disposed within the sleeve shaft; a fixed shaft is disposed in a central portion of the display module, and inserted into the sleeve shaft, and an outer wall of the fixed shaft is connected to an inner ring of the second bearing; an end portion of an insertion end of the fixed shaft extends through a bottom of the mounting tube to form a limiting connection; and the drive module is disposed on an outer side of the mounting tube and cooperates with the fan blade.

6 Claims, 6 Drawing Sheets

HOLLOW-STRUCTURED COOLING FAN

CROSS-REFERENCE TO RELATED APPLICATION

This application claims the priority benefit of China application serial no. 202520910555.3, filed on May 9, 2025. The entirety of the above-mentioned patent applications is hereby incorporated by reference herein and made a part of this specification.

BACKGROUND

Technical Field

The present disclosure relates to the technical field of fans, and in particular to a hollow-structured cooling fan.

Description of Related Art

With the changes in market consumption trends, people are paying more and more attention to the visual aesthetics of assembled computer peripherals. In addition to computer case designs, many structural features such as transparent exteriors and integrated lighting have been introduced. As a result, for conventional monotonous cooling fan structures, some manufacturers have attempted to incorporate brand logos, images, or even display screens on a surface of the cooling fan. However, such content is only visible when the cooling fan is stationary. Once the cooling fan begins to rotate, the displayed content becomes indistinct.

In view of the above problems, cooling fans of which fan blades rotate while the display screen or brand logo remains stationary have been developed, such as Chinese Patent No. CN218894790U. However, to achieve the above functional characteristics, a structure of the cooling fan will become complicated, which makes the assembly of the cooling fan extremely inconvenient. Therefore, further improvements need to be made based on this structure.

SUMMARY

The present disclosure aims to provide a hollow-structured cooling fan which is simplified in structure and easy to assemble.

In order to solve the above technical problems, the present disclosure implements the following technical solution:

A hollow-structured cooling fan, including:

- a fan frame, where a cylindrical mounting tube is disposed in a central portion of the fan frame, and a first bearing is disposed within the mounting tube;
- a fan blade, where a hollow sleeve shaft is disposed in a central portion of the fan blade, the sleeve shaft is inserted into the mounting tube, an outer wall of the sleeve shaft is connected to an inner ring of the first bearing, and a second bearing is disposed within the sleeve shaft;
- a display module, where a hollow fixed shaft is disposed in a central portion of the display module, the fixed shaft is inserted into the sleeve shaft, and an outer wall of the fixed shaft is connected to an inner ring of the second bearing; and an end portion of an insertion end of the fixed shaft extends through a bottom of the mounting tube to form a limiting connection; and
- a drive module, where the drive module is disposed on an outer side of the mounting tube and cooperates with the fan blade; and when the drive module drives the fan blade to rotate, the display module forms a stationary state through the fixed shaft.

In one embodiment, a first elastic member is disposed between an inner side of the mounting tube and an outer side of the sleeve shaft in this embodiment, opposite ends of the first elastic member respectively abut against the fan blade and the first bearing.

In one embodiment, a second elastic member is disposed between an inner side of the sleeve shaft and an outer side of the fixed shaft, and opposite ends of the second elastic member respectively abut against the display module and the second bearing.

In one embodiment, a first flat surface is formed on the insertion end of the fixed shaft, and a second flat surface corresponding to the first flat surface is formed in a through hole at the bottom of the mounting tube.

In one embodiment, a retaining slot is formed at the end portion of the insertion end of the display module; and after the insertion end of the fixed shaft extends through the bottom of the mounting tube, a retaining ring is snapped-fitted into the retaining slot to limit a connection between the fixed shaft and the mounting tube.

In one embodiment, the display module is a display screen, the display module is electrically connected to the drive module through wires to display images or texts, and the wires are routed through an interior of the fixed shaft.

Beneficial effects:

For the hollow-structured cooling fan provided in the present disclosure, a mounting tube is disposed in the central portion of the fan frame, a drive module is mounted on an outer side of the mounting tube, a first bearing is disposed within the mounting tube, and a hollow sleeve shaft of the fan blade is inserted into the mounting tube and is connected to the first bearing; a second bearing is disposed within the hollow sleeve shaft, and a hollow fixed shaft of the display module is inserted into the sleeve shaft and is connected to the second bearing. The bottom end of the fixed shaft extends through the bottom of the mounting tube for positioning and securing, thereby completing the assembly of the cooling fan. The overall structure of the cooling fan can be simplified through the mounting tube of the fan frame, the hollow sleeve shaft of the fan blade and the hollow fixed shaft of the display module, enabling quick and convenient assembly. After assembly, the drive module can drive the fan blade to rotate, and the display module can form a stationary state through the fixed shaft during the rotation of the fan blade.

DESCRIPTION OF THE EMBODIMENTS

Figure 1:
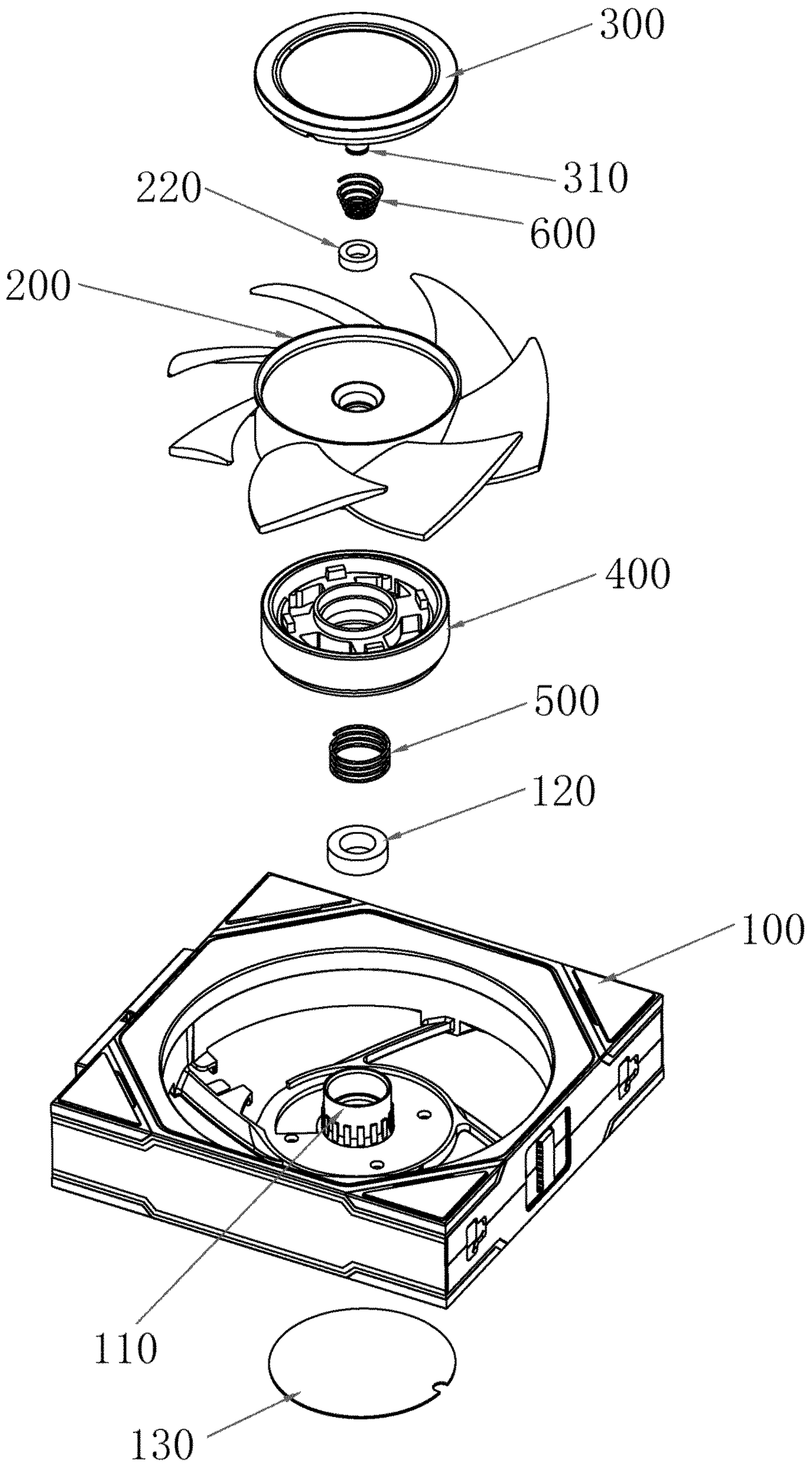
FIG. 1 is an exploded view of a hollow-structured cooling fan according to the present disclosure.

To make the objectives, features, and advantages mentioned above of the present disclosure more apparent and easily understood, the specific implementation of the present disclosure will be described in detail below with reference to the drawings. Many specific details are set forth in the following description to facilitate thorough understanding of the present disclosure. However, the present disclosure may be implemented in many other ways different from those described herein, similar improvements may be made by those skilled in the art without departing from the connotation of the present disclosure, and therefore, the present disclosure is not limited by the specific implementation disclosed below.

It should be noted that if an element is considered to be "fixed to" the other element, it means that the element may be directly on the other element or indirectly on the other element, or intervening elements may also be present. When an element is considered to be "connected" to another element, the element may be directly connected to another element or there may be an intermediate element simultaneously. In contrast, when an element is referred to as "directly" connected to another element, there is no intermediate element. The terms "vertical," "horizontal," "left," "right," and the like as used herein are for illustrative purposes only.

Unless otherwise defined, all technical and scientific terms mentioned herein have the same meaning as commonly understood by those skilled in the technical field of the present disclosure. The terms used in the specification of the present disclosure herein are just for the purpose of describing particular embodiments, and are not intended to limit the present disclosure. As mentioned herein, the term "and/or" includes any and all combinations of one or more relevant listed items.

Referring to FIGS. 1-6, a hollow-structured cooling fan is provided, including:

- a fan frame 100; a cylindrical mounting tube 110 is disposed in a central portion of the fan frame 100, and a first bearing 120 is disposed within the mounting tube 110;
- a fan blade 200; a hollow sleeve shaft 210 is disposed in a central portion of the fan blade 200, the sleeve shaft 210 is inserted into the mounting tube 110, an outer wall of the sleeve shaft is connected to an inner ring of the first bearing 120, and a second bearing 220 is disposed within the sleeve shaft 210;
- a display module 300; a hollow fixed shaft 310 is disposed in a central portion of the display module 300, the fixed shaft 310 is inserted into the sleeve shaft 210, and an outer wall of the fixed shaft is connected to an inner ring of the second bearing 220; and an end portion of an insertion end of the fixed shaft 310 extends through a bottom of the mounting tube 110 to form a limiting connection; and
- a drive module 400; the drive module 400 is disposed on an outer side of the mounting tube 110 and cooperates with the fan blade 200; and when the drive module 400 drives the fan blade 200 to rotate, the display module 300 forms a stationary state through the fixed shaft 310.

Specifically, in this embodiment, the mounting tube 110 is disposed in the central portion of the fan frame 100, the drive module 400 is disposed on the outer side of the mounting tube 110, the first bearing 120 is mounted within the mounting tube 110, and the first bearing 120 is a ball bearing. The hollow sleeve shaft 210 of the fan blade 200 is inserted into the mounting tube 110, and the outer wall of the sleeve shaft 210, after the insertion, is in interference connection with inner ring of the first bearing 120. A second bearing 220 is disposed within the hollow sleeve shaft 210, and the second bearing 220 is also a ball bearing. After the fan blade 200 is assembled with the fan frame 100, the fixed shaft 310 of the display module 300 is inserted from the sleeve shaft 210, and the end portion of the insertion end extends through the bottom of the mounting tube 110 for position limiting and fixation, thereby completing assembly of the cooling fan. The mounting tube 110 disposed on the fan frame 100, the hollow sleeve shaft 210 in the central portion of the fan blade 200, and the hollow fixed shaft 310 of the display module 300 simplify an overall structure of the cooling fan, facilitating assembly among the fan frame 100, the fan blade 200, the display module 300, and the drive module 400. After assembly, the display module 300 and fan blade 200 will not affect each other. When the drive module 400 drives the fan blade 200 to rotate, the display module 300 forms a stationary state through the fixed shaft 310, thereby greatly improving the visual appeal and entertainment value of the cooling fan to meet consumer demands.

In addition, in order to enable a fixed connection between the display module 300 and the mounting tube 110, and a retaining slot 312 is formed at the end portion of the insertion end of the fixed shaft 310 of the display module 300; after the insertion end of the fixed shaft 310 extends through the bottom of the mounting tube 110, a retaining ring 320 may be snapped-fitted into the retaining slot 312 to limit the insertion end of the fixed shaft 310, thereby realizing the assembly and connection between the fixed shaft 310 and the mounting tube 110. Moreover, in order to enhance the stability of the fixed shaft 310 after assembly, a first flat surface 311 is formed on the insertion end of the fixed shaft 310, and a second flat surface 111 corresponding to the first flat surface 311 is formed in a through hole at the bottom of the mounting tube 110. The engagement between the first flat surface 311 and the second flat surface 111 prevents the fixed shaft 310 from rotating, ensuring a reliable connection structure between the display module 300 and the mounting tube 110, and ensuring the stability of the display module 300 after assembly.

Further, in order to achieve heat dissipation, a plurality of blades 230 are spaced apart on an outer periphery of the fan blade 200. When the drive module 400 drives the fan blade 200 to rotate, the fan blade 200 will drive the plurality of blades 230 to rotate, the rotation of the blades 230 dissipate heat from an electronic device. Moreover, since an outer side of the sleeve shaft 210 of the fan blade 200 is connected to the inner ring of the first bearing 120, and an inner side of the sleeve shaft 210 is connected to an outer ring of the second bearing 220, making the rotation of the fan blade 200 smoother and thereby ensuring effective operation of the fan blade 200.

Figure 2:
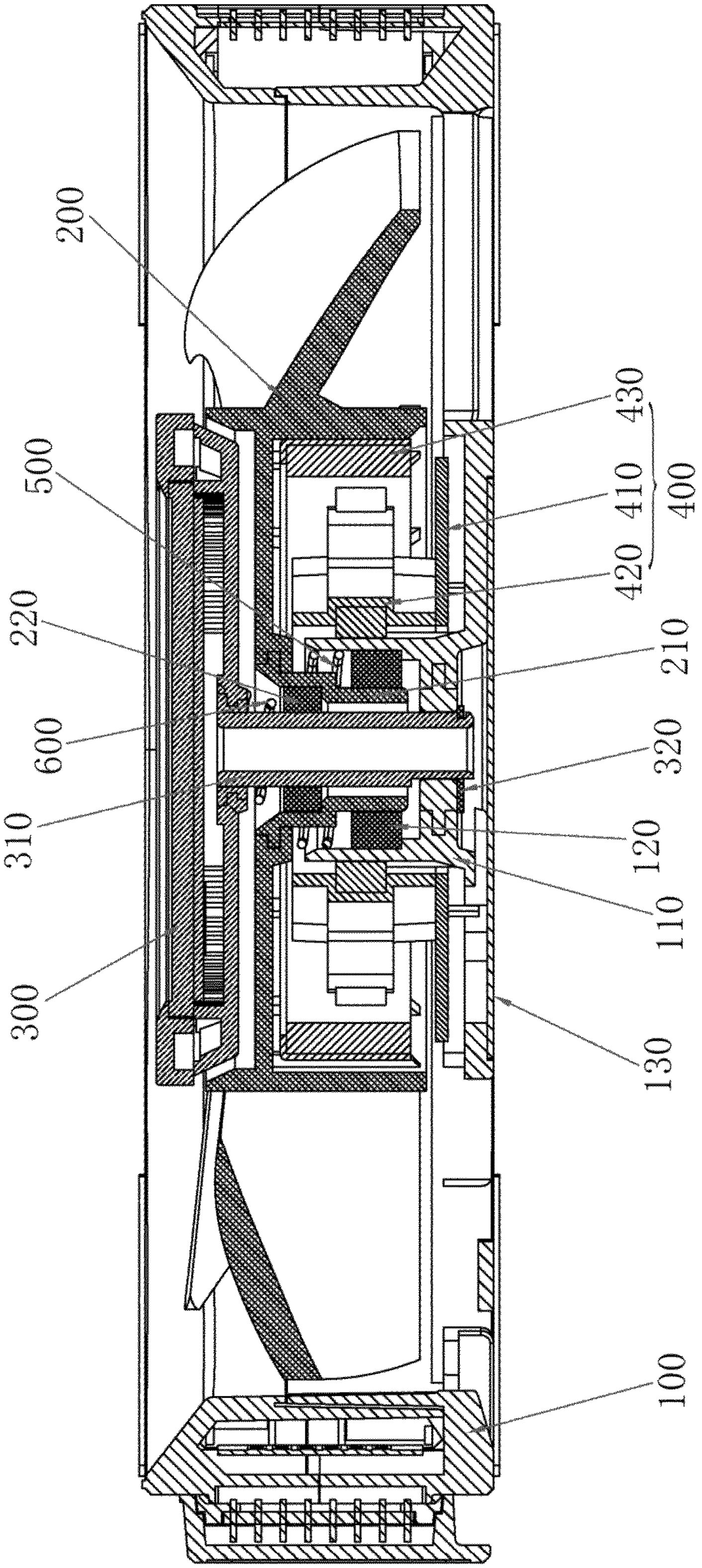
FIG. 2 is a sectional view of a hollow-structured cooling fan according to the present disclosure.
Figure 3:
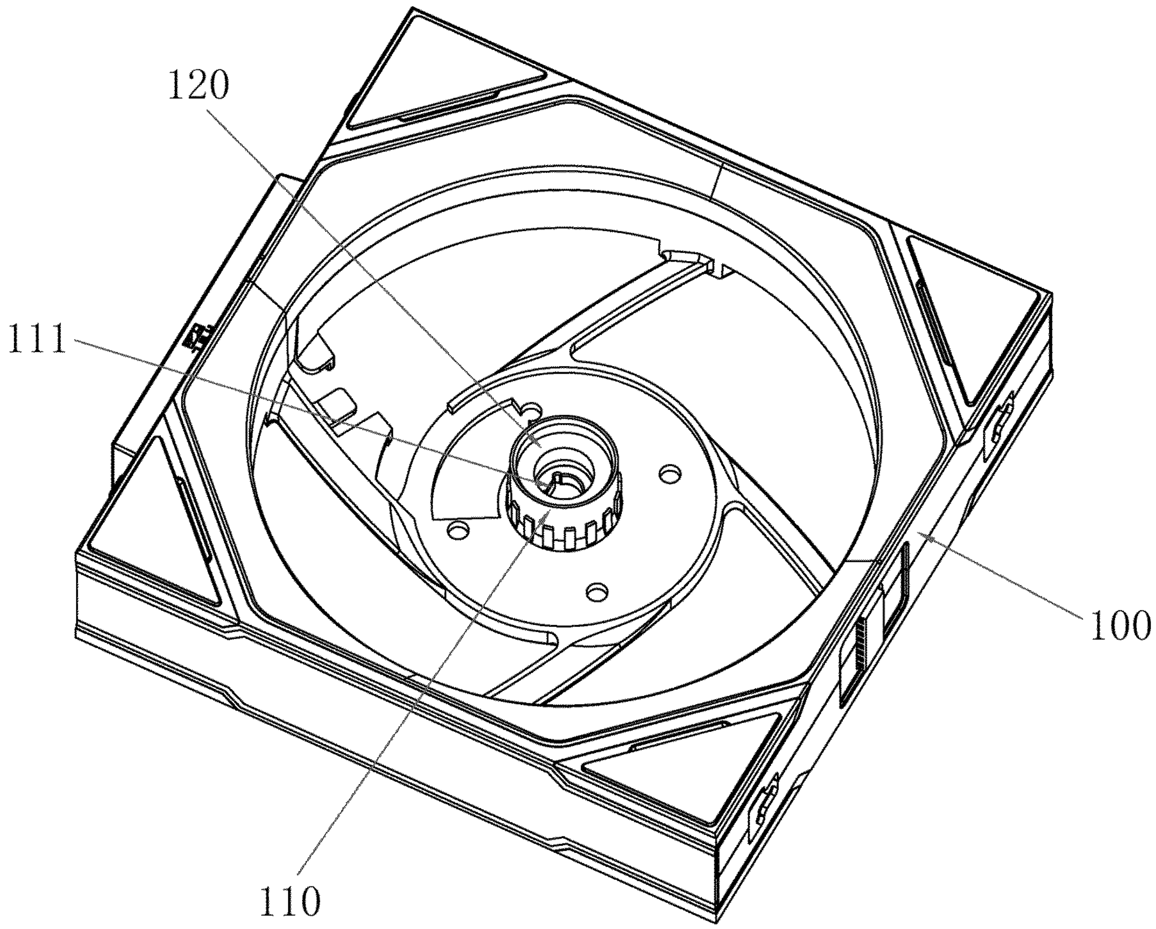
FIG. 3 is a schematic diagram of a fan frame of a hollow-structured cooling fan according to the present disclosure.
Figure 4:
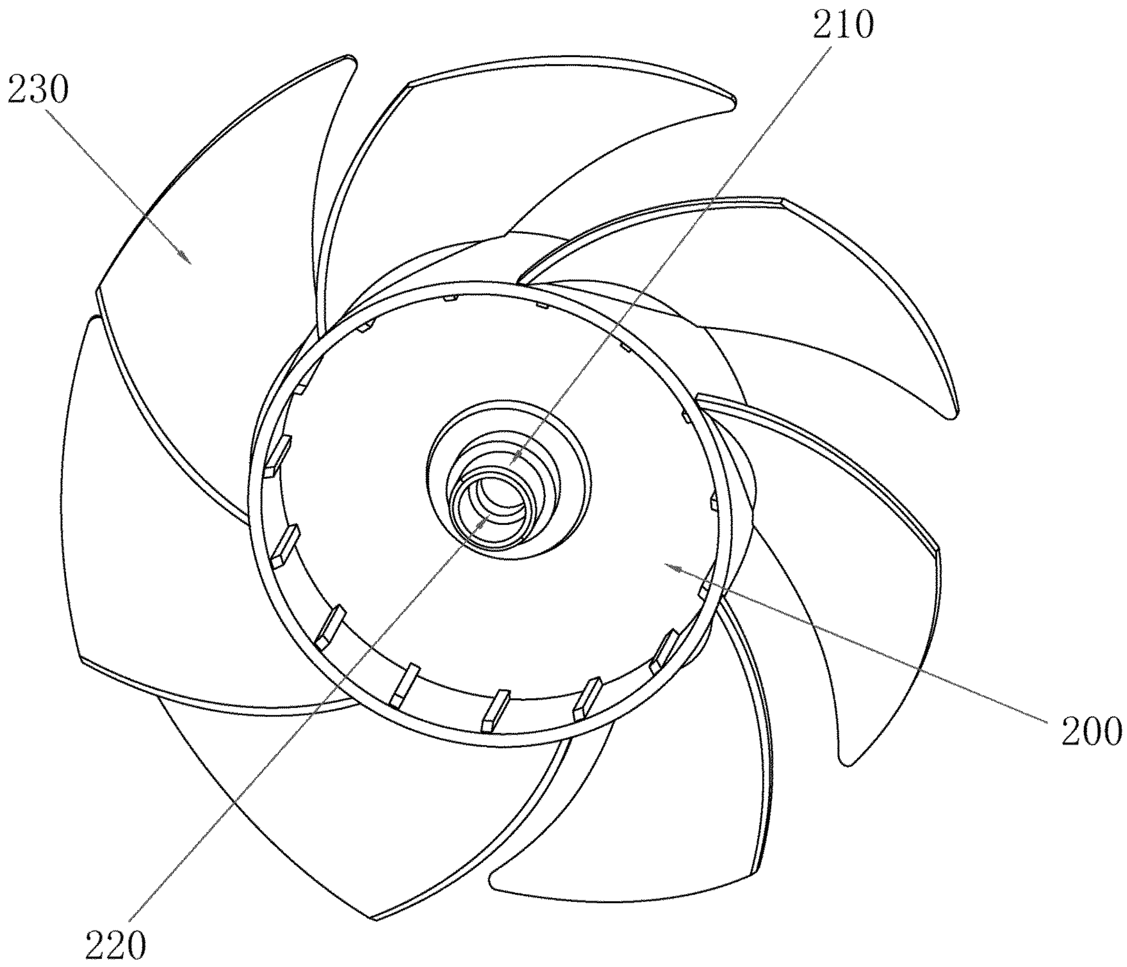
FIG. 4 is a schematic diagram of a fan blade of a hollow-structured cooling fan according to the present disclosure.
Figure 5:
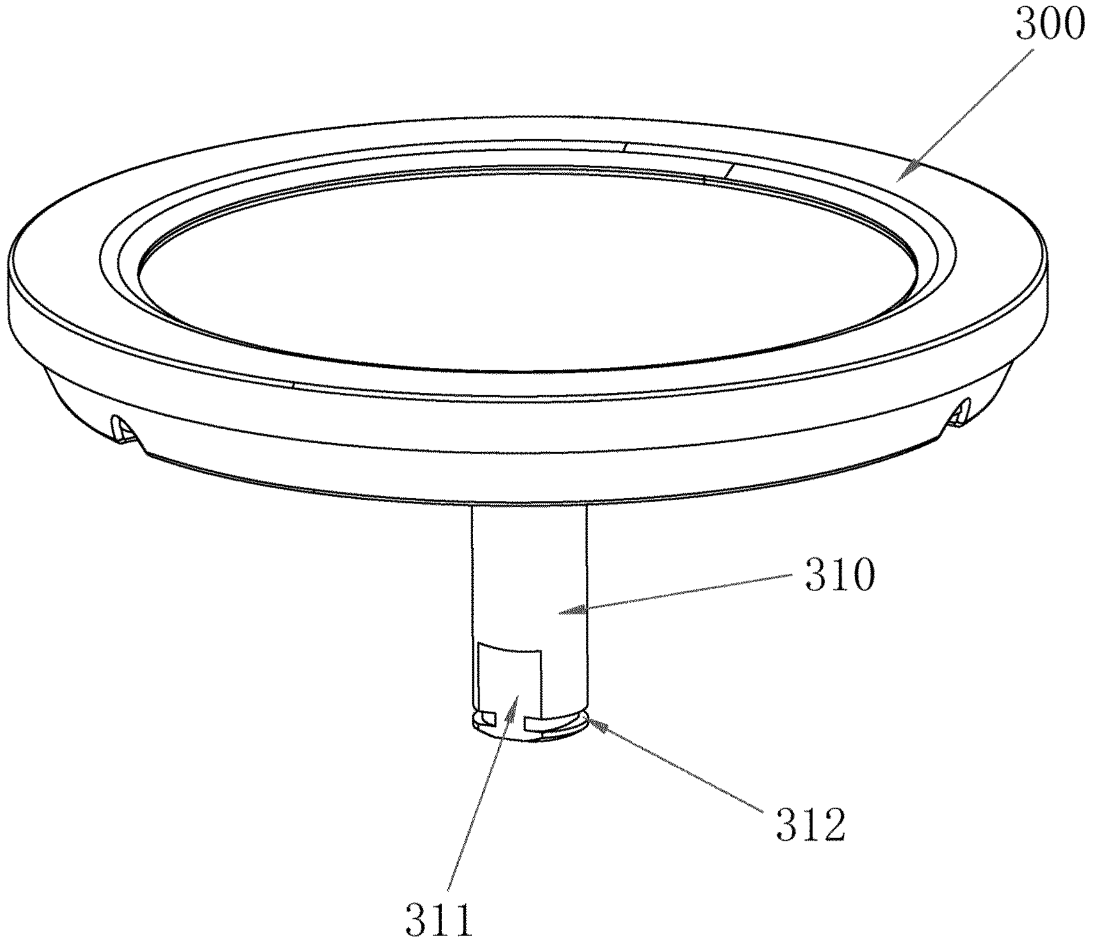
FIG. 5 is a schematic diagram of a display module of a hollow-structured cooling fan according to the present disclosure.

Referring to FIGS. 1 and 2, in order to prevent the fan blade 200 from axial displacement during rotation, a first elastic member 500 is disposed between an inner side of the mounting tube 110 and an outer side of the sleeve shaft 210 in this embodiment, opposite ends of the first elastic member 500 respectively abut against the fan blade 200 and the first bearing 120; and a second elastic member 600 is disposed between an inner side of the sleeve shaft 210 and an outer side of the fixed shaft 310, and opposite ends of the second elastic member 600 respectively abut against the display module 300 and the second bearing 220. The fan blade 200 is limited at both sides through the first elastic member 500 and the second elastic member 600, and the axial displacement of the fan blade 200 during rotation is thus effectively avoided, so as to ensure normal and stable operation of the fan blade 200, and the first elastic member 500 and the second elastic member 600 can be both springs.

Figure 6:
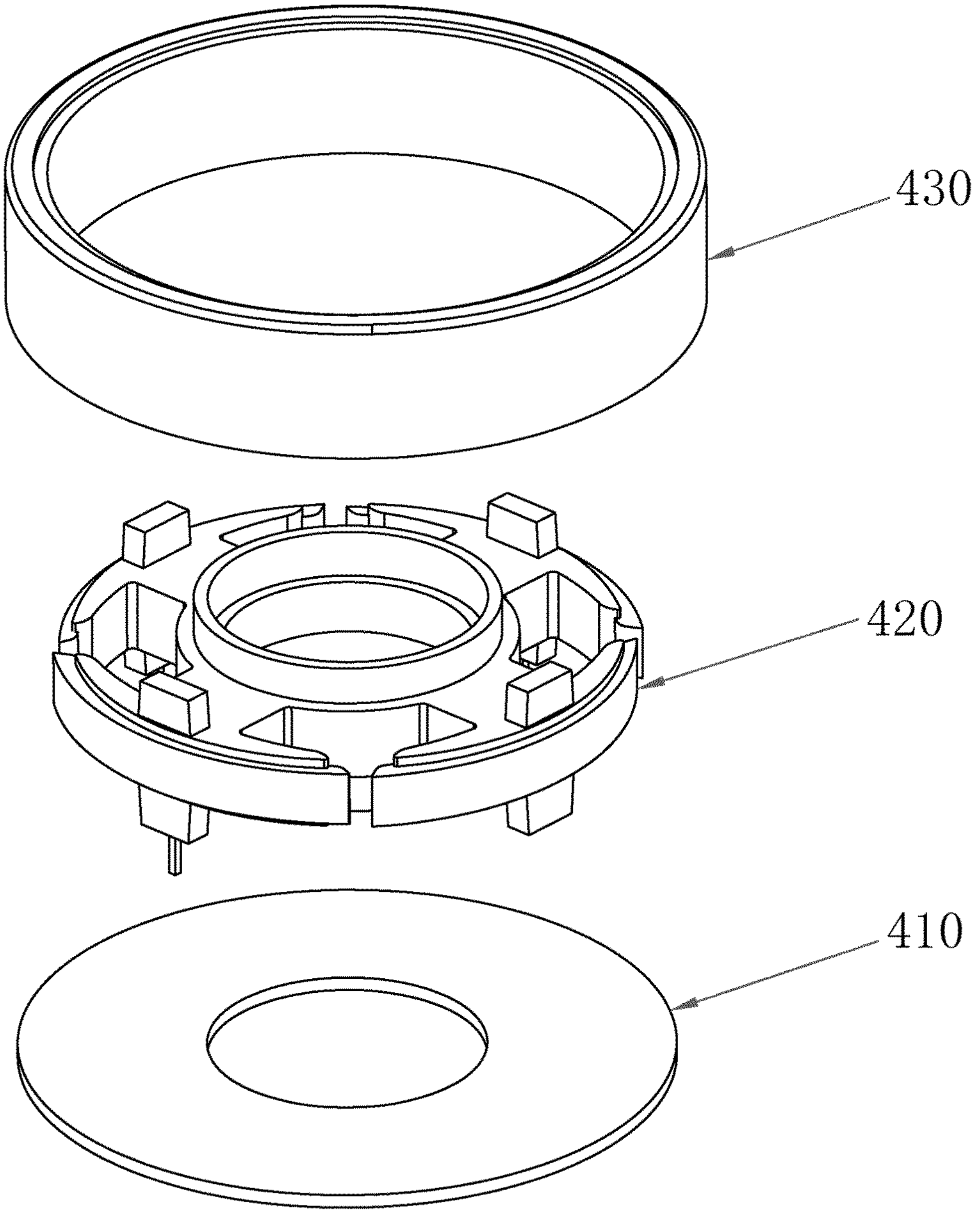
FIG. 6 is an exploded view of a drive module of a hollow-structured cooling fan according to the present disclosure.

Referring to FIGS. 2 and 6, in order to drive the fan blade 200 to rotate, the drive module 400 in this embodiment includes a PCB board 410, a stator 420, and a rotor 430; the stator 420 is sleeved on the outer side of the mounting tube 110 and is electrically connected to the PCB board 410, and the rotor 430 is connected to the fan blade 200 and cooperates with the stator 420 for rotation. The cooperation among the PCB board 410, the stator 420, and the rotor 430 enables the conversion between electrical energy and mechanical energy, thereby ensuring the driving to the fan blade 200. A structure of the drive module 400 is a prior art, which will not be described in further detail herein.

Referring to FIG. 2. In this embodiment, the display module 300 is a display screen, and the display module 300 is electrically connected to the PCB board 410 of the drive module 400 through wires. The display module 300 is controlled by the PCB board 410, such that the display module 300 can display images, text, or other content. Since the display module 300 remains stationary when the fan blade 200 is rotates, any brand logos, images, text, or even videos on the display module 300 can be clearly presented without being affected by the rotation of the fan blade 200.

Moreover, when routing the wires connecting the display module 300 and the PCB board 410, the wires may be routed through an interior of the hollow fixed shaft 310, such that the wires can be concealed to avoid interference with other components, such that an overall layout of the cooling fan is reasonable. In addition, after the wiring is completed, a cover 130 may be covered on a bottom surface of the mounting tube 110 to seal the bottom surface of the mounting tube 110, forming an integrated structure of the cooling fan, effectively preventing the ingress of dust and debris, thereby extending a service life of the cooling fan.

What is shown and described above is about basic principles, essential features and advantages of the present disclosure. Those skilled in the art may readily implement the present disclosure based on the accompanying drawings and the foregoing description. However, any equivalent changes, modifications, or variations made by those skilled in the art without departing from the scope of the technical solution of the present disclosure based on the technical content of the present disclosure are all equivalent embodiments of the present disclosure. In addition, any equivalent modifications, alterations, or variations made to the above embodiments based on the essential technical spirit of the present disclosure shall fall within the scope of protection of the technical solution of the present disclosure.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A hollow-structured cooling fan, comprising:

a fan frame, wherein a cylindrical mounting tube is disposed in a central portion of the fan frame, and a first bearing is disposed within the mounting tube;

a fan assembly, wherein a hollow sleeve shaft is disposed in a central portion of the fan assembly, the sleeve shaft is inserted into the mounting tube, an outer wall of the sleeve shaft is connected to an inner ring of the first bearing, and a second bearing is disposed within the sleeve shaft;

a display module, wherein a hollow fixed shaft is disposed in a central portion of the display module, the fixed shaft is inserted into the sleeve shaft, and an outer wall of the fixed shaft is connected to an inner ring of the second bearing; and an end portion of an insertion end of the fixed shaft extends through a bottom of the mounting tube to form a limiting connection; and a drive module, wherein the drive module is disposed on an outer side of the mounting tube and cooperates with the fan assembly; and when the drive module drives the fan assembly to rotate, the display module is in a stationary state through the fixed shaft.

2. The hollow-structured cooling fan according to claim 1, wherein a first elastic member is disposed between an inner side of the mounting tube and an outer side of the sleeve shaft, and opposite ends of the first elastic member respectively abut against the fan assembly and the first bearing.

3. The hollow-structured cooling fan according to claim 2, wherein a second elastic member is disposed between an inner side of the sleeve shaft and an outer side of the fixed shaft, and opposite ends of the second elastic member respectively abut against the display module and the second bearing.

4. The hollow-structured cooling fan according to claim 1, wherein a first flat surface is formed on the insertion end of the fixed shaft, and a second flat surface corresponding to the first flat surface is formed in a through hole at the bottom of the mounting tube.

5. The hollow-structured cooling fan according to claim 1, wherein a retaining slot is formed at the end portion of the insertion end of the display module; and after the insertion end of the fixed shaft extends through the bottom of the mounting tube, a retaining ring is snapped-fitted into the retaining slot to limit a connection between the fixed shaft and the mounting tube.

6. The hollow-structured cooling fan according to claim 1, wherein the display module is a display screen, the display module is electrically connected to the drive module through wires to display images or texts, and the wires are routed through an interior of the fixed shaft.

* * * * *